(12) United States Patent
Yanke

(10) Patent No.: US 7,703,268 B2
(45) Date of Patent: Apr. 27, 2010

(54) ROTARY CUTTER BAR MECHANISM AND BLADE PIN COUPLING

(75) Inventor: Bryan Ray Yanke, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/235,040

(22) Filed: Sep. 22, 2008

(65) Prior Publication Data

US 2010/0071338 A1    Mar. 25, 2010

(51) Int. Cl.
*A01D 34/52* (2006.01)
*A01D 34/73* (2006.01)

(52) U.S. Cl. .......................... 56/295; 56/255

(58) Field of Classification Search .............. 56/295, 56/255, 17.5, DIG. 17, 320.1
See application file for complete search history.

(56) References Cited

U.S. PATENT DOCUMENTS

| | | | | |
|---|---|---|---|---|
| 3,690,051 A | * | 9/1972 | Wood | 56/295 |
| 3,918,241 A | * | 11/1975 | Stillions | 56/12.7 |
| 4,525,990 A | * | 7/1985 | Zweegers | 56/295 |
| 4,815,264 A | * | 3/1989 | Mijnders | 56/295 |
| 5,622,035 A | * | 4/1997 | Kondo et al. | 56/12.7 |
| 5,640,836 A | * | 6/1997 | Lingerfelt | 56/255 |
| 5,809,765 A | * | 9/1998 | Hastings et al. | 56/295 |
| 6,026,635 A | * | 2/2000 | Staiger | 56/295 |
| 6,055,798 A | * | 5/2000 | Fulmer et al. | 56/12.7 |
| 6,959,530 B2 | * | 11/2005 | Thompson et al. | 56/295 |
| 7,506,494 B2 | * | 3/2009 | Eavenson et al. | 56/17.5 |
| 2001/0000376 A1 | * | 4/2001 | Vastag | 56/17.3 |

FOREIGN PATENT DOCUMENTS

| CA | 2477180 | | 2/2006 |
|---|---|---|---|
| EP | 0022588 A | * | 1/1982 |
| EP | 0517645 | | 12/1992 |
| EP | 0807374 | | 11/1997 |
| EP | 1228680 | | 12/2006 |

OTHER PUBLICATIONS

European Search Report, 6 Pages, Feb. 15, 2010.

\* cited by examiner

*Primary Examiner*—Árpád Fábián-Kovács

(57) ABSTRACT

A rotary mowing implement including a rotary cutter bar disk, at least one hub, a blade element, a pin, and a pin retaining mechanism. The at least one hub is connected to the rotary cutter bar disk. The blade element has a hole therein. The pin couples the blade element to the hub. The pin is insertable through the hole and is removably coupled to the hub. The pin retaining mechanism couples the pin to the hub.

10 Claims, 3 Drawing Sheets

ROTARY CUTTER BAR MECHANISM AND BLADE PIN COUPLING

FIELD OF THE INVENTION

The present invention relates to agricultural mowing implements, and, more particularly to rotary cutter bar knife holding devices associated with such implements.

BACKGROUND OF THE INVENTION

Rotary mowers which rotate about a vertical axis have been utilized by agricultural purposes for several decades. Single blades driven by power take off units from a tractor gave way to multiple blades being driven in either a synchronized manner or by locating multiple blades in an offset pattern so that the mowing patterns would overlap. As mowers have improved, cutter bar disks were added with multiple knife blades attached to each cutter bar disk. Each rotary cutter bar disk has a shape that is not necessarily completely a disk but is rather a balanced holder that may resemble a modified ellipse. The rotatory cutter bar disk includes elements to hold the knife blades therein.

Changing knives on a rotary motor or conditioner cutter bar occurs frequently. It is known to use a spring plate located as a part of the cutter bar disk to secure the knife. In order to change the knife blade, a prying mechanism is utilized to pry the spring plate so that the knife can be released and replaced. Another holding device includes the use of a clip, which is slid out using a prying mechanism. Once the blade is replaced, the clip is tapped back into place. These processes can be cumbersome and time consuming.

What is needed in the art is a knife holding system that allows for rapid changing of rotary mower/conditioner knives, particularly one that would allow changing of each knife in less than 10 seconds.

SUMMARY OF THE INVENTION

The invention in one form is directed to a rotary mowing implement including a rotary cutter bar disk, at least one hub, a blade element, a pin, and a pin retaining mechanism. The at least one hub is connected to the rotary cutter bar disk. The blade element has a hole therein. The pin couples the blade element to the hub. The pin is insertable through the hole and is removably coupled to the hub. The pin retaining mechanism couples the pin to the hub.

DETAILED DESCRIPTION OF THE INVENTION

Figure 1:
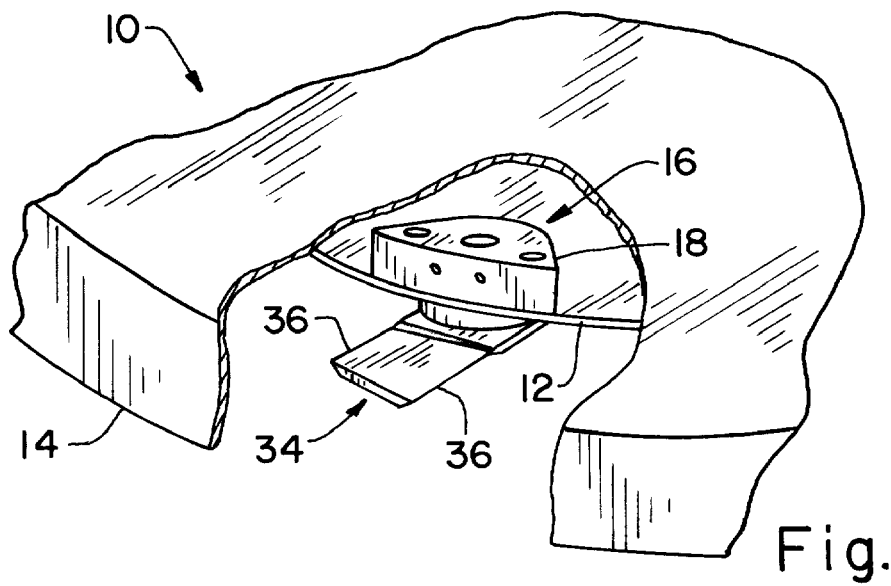
FIG. 1 is a partially cut away view of a mower mechanism utilizing an embodiment of a knife holding system of the present invention.
Figure 2:
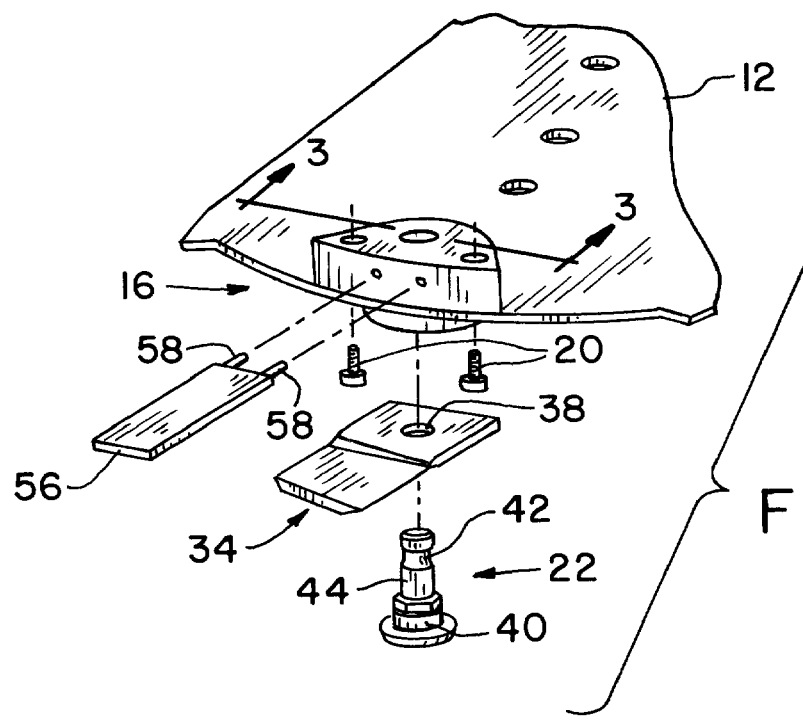
FIG. 2 is an exploded view of the knife holding mechanism of FIG. 1.
Figure 3:
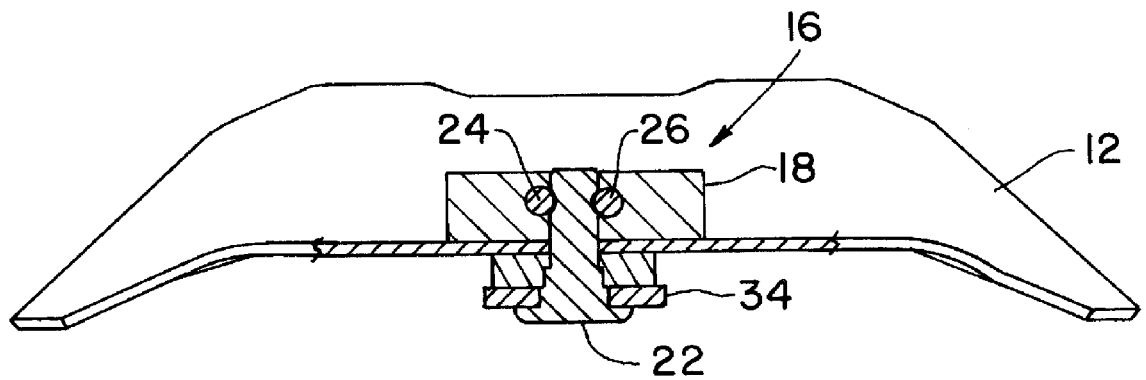
FIG. 3 is an end view of the knife holding mechanism of FIGS. 1 and 2.
Figure 4:
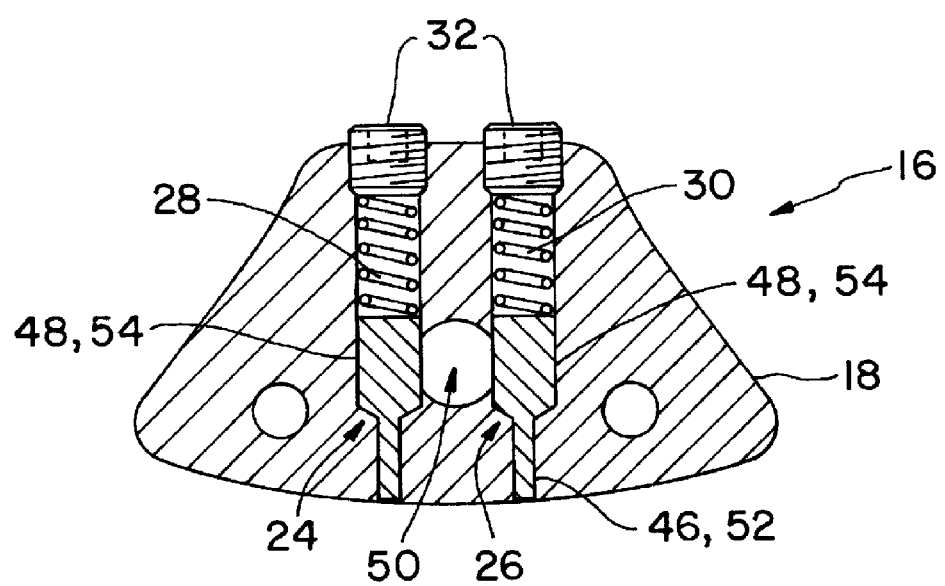
FIG. 4 is a sectioned view of the knife holding mechanism utilizing FIGS. 1-3.
Figure 5:
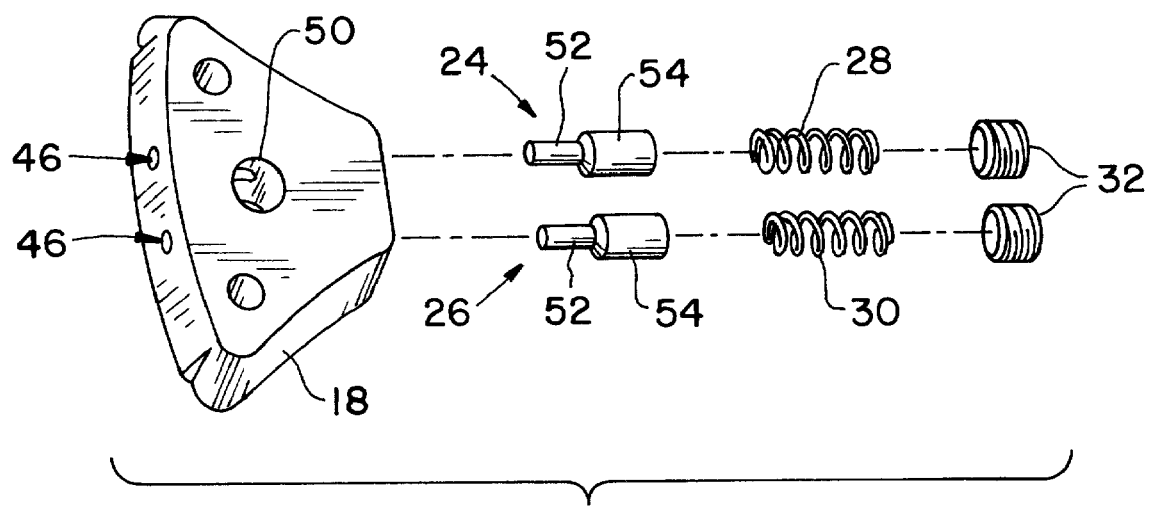
FIG. 5 is an exploded view of the knife holding mechanism of FIGS. 1-4.

Referring now to the drawings, and more particularly to FIG. 1, there is illustrated, a mower/conditioner 10 with a rotary cutter bar disk 12 as seen through a cut out in shield 14. Shield 14 is provided to direct the flow of cut material and to provide a protective barrier of the operating mechanisms from an operator. Rotary cutter bar disk 12 has a knife holding mechanism 16 connected thereto. While only one knife holding mechanism 16 is illustrated, it is understood that rotary cutter bar disk 12 may include at least two knife holding mechanisms 16. It is also understood, and not shown for the sake of clarity, that multiple rotary cutter bar disks 12 would be utilized on mower/conditioner 10.

Now, additionally referring to FIGS. 2-5, knife holding mechanism 16 is illustrated as including a hub 18, bolts 20, a pin 22, retaining pins 24 and 26, biasing mechanisms 28 and 30, and plugs 32. Knife 34 is removably connected to hub 18 by way of interaction of pin 22 and retaining pins 24 and 26. Hub 18 has bolts 20 that connect hub 18 to rotary cutter bar disk 12. Pin 22 is inserted through hole 38 of knife 34 and pin 22 is retained to hub 18 by way of retaining pins 24 and 26.

Retaining pins 24 and 26, also referred to as biased pins 24 and 26, are positioned within hub 18 and are biased into a position being held there by springs 28 and 30. Plugs 32 are threaded into hub 18 thereby captivating pins 24 and 26 and their associated springs 28 and 30.

Knife 34 includes sharpened edges 36 and hole 38. Sharpened edges 36 may allow knife 34 to be flipped over to thereby utilize the other sharpened edge to double the useful life of knife 34 prior to sharpening or replacement. Hole 38 has pin 22 inserted therethrough and knife 34 can swing completely around pin 22 without constraint. Pin 22 cannot rotate in hub 18 when knife pin 22 is inserted. Pin 22 can be repositioned in hub 18, but must be removed, reoriented, and reinserted in order to accomplish this.

Pin 22 includes a knife retaining portion 40, a groove 42, and a shaft portion 44. Knife retaining portion 40 interacts with hole 38 and is sized to allow knife 34 to rotate about pin 22 particularly when rotatory cutter bar disk 12 is accelerating, decelerating or when knife 34 encounters a significant obstruction or load. The centrifugal force imparted to knife 34 as rotatory cutter bar disk 12 rotates causes knife 34 to extend substantially perpendicular to the rotational axis of rotary cutter bar disk 12. Shaft 44 has a groove 42 cut therein that is sized and shaped to accommodate a portion of retaining pins 24 and 26. The interaction of pin 22 with hub 18 is such that one retaining pin 24 or 26 may be sufficient to hold pin 22 in position but it is preferred to have two retaining pins so that each side of shaft 44 is in contact with both retaining pins 24 and 26.

Hub 18 has holes 46 of a first diameter and a cavity 48 of a second diameter that is larger than the first diameter. Hub 18 additionally has a hole 50 to accommodate pin 22. Hole 46 extends to an outer portion of hub 18 thereby allowing first diameter 52 of retaining pins 24 and 26 to extend therein. Second diameter 54 of pins 24 and 26 is larger than first diameter 52. The surface of first diameter 52 is accommodated by hole 46 and second diameter 54 is accommodated by cavity 48. This arrangement allows retaining pins 24 and 26 to be retained having first diameter 52 extend proximate to the surface of hub 18.

Release tool 56 includes spaced/sized protrusions 58 that are positioned and sized to interact with holes 46 to enter therein to thereby depress retaining pins 24 and 26 substantially simultaneously pushing them in so that first diameter 52 is then located proximate to groove 42. Since first diameter 52 is selected such that there is no interference with pin 22, pin 22 is thereby released from hub 18 when release tool 56 is utilized to depress retaining pins 24 and 26. The dual retaining pin 24 and 26 system is illustrated as being substantially parallel to each other although other arrangements are also possible.

Release tool 56 allows the operator to easily depress retaining pins 24 and 26 so that pin 22 drops out of hub 18 thereby releasing knife 34 with pin 22. Pin 22 is then removed from knife 34. Knife 34 may be rotated about its longitudinal axis or a new knife 34 may be utilized with pin 22 being inserted through hole 38 and into hole 50 of hub 18 while retaining pins 24 and 26 are depressed with release tool 56. Once pin 22 is inserted into hole 50 to a sufficient depth, release tool 56 may be removed allowing retaining pins 24 and 26 to be returned to their home positions by way of biasing mechanisms 28 and 30, thereby retaining the new knife blade to hub 18. This process then is repeated for each knife 34 utilized in mowing implement 10.

The present invention advantageously does not require a prying mechanism but rather a simple inserted release tool. It is also contemplated that a mechanism to hold release tool 56 with retaining pins 24 and 26 being depressed is also possible to thereby allow single-handed changing of knife blade 34.

Having described the preferred embodiment, it will become apparent that various modifications can be made without departing from the scope of the invention as defined in the accompanying claims.

The invention claimed is:

1. A rotary mowing implement, comprising:
a rotary cutter bar disk;
at least one hub connected to said rotary cutter bar disk;
a blade element having a hole therein;
a coupling pin coupling said blade element to said hub, said coupling pin being insertable through said hole and being removably coupled to said hub; and
a biased pin retaining mechanism coupling said coupling pin to said hub said pin retaining mechanism having at least a first biased pin and a second biased pin, said first biased pin and said second biased pin being substantially similar, each being biased by separate springs, said first biased pin and said second biased pin each having a longitudinal axis that is substantially perpendicular to a longitudinal axis of said coupling pin each having a coupling feature, and each biased pin interacting with said coupling feature to retain said coupling pin to said hub, with each biased pin including a first surface having a first dimension from said longitudinal axis and a second surface having a second dimension from said longitudinal axis, said first dimension being smaller than said second dimension, said second dimension being such that said second surface interacts with said coupling feature to retain said coupling pin to said hub, said first dimension being such that said first surface when proximate to said coupling feature does not interact with said coupling feature allowing said coupling pin to be disengaged from said hub.

2. The rotary mowing implement of claim 1, wherein said blade can rotate completely about said coupling pin.

3. The rotary mowing implement of claim 1, wherein said hub has an opening for each of said biased pins, said openings being sized to allow said first surface to enter therein while excluding said second surface.

4. The rotary mowing implement of claim 3, wherein said first biased pin and said second biased pin must both be depressed to insert said coupling pin into said hub and to release said coupling pin from said hub.

5. The rotary mowing implement of claim 3, further comprising a releasing tool configured to simultaneously depress both said first biased pin and said second biased pin.

6. A hub mechanism for use on a rotary mowing implement, the hub mechanism interacting with a blade element having a hole therein, the hub mechanism comprising:
a hub;
a coupling pin configured to couple the blade element to said hub, said coupling pin being insertable through the hole and being removably coupled to said hub; and
a biased pin retaining mechanism coupling said coupling pin to said hub said pin retaining mechanism having at least a first biased pin and a second biased pin, said first biased pin and said second biased pin being substantially similar, each being biased by separate springs, said first biased pin and said second biased pin each having a longitudinal axis that is substantially perpendicular to a longitudinal axis of said coupling pin, each biased pin having a coupling feature, and each biased pin interacting with said coupling feature to retain said coupling pin to said hub, with each biased pin including a first surface having a first dimension from said longitudinal axis and a second surface having a second dimension from said longitudinal axis, said first dimension being smaller than said second dimension, said second dimension being such that said second surface interacts with said coupling feature to retain said coupling pin to said hub, said first dimension being such that said first surface when proximate to said coupling feature does not interact with said coupling feature allowing said coupling pin to be disengaged from said hub.

7. The hub mechanism of claim 6, wherein the hub is configured to allow the blade to rotate completely about said pin.

8. The hub mechanism of claim 6, wherein said hub has an opening for each of said biased pins, said openings being sized to allow said first surface to enter therein while excluding said second surface.

9. The hub mechanism of claim 8, wherein said first biased pin and said second biased pin must both be depressed to insert said pin into said hub and to release said coupling pin from said hub.

10. The hub mechanism of claim 8, wherein said hub is configured to interact with a releasing tool that is configured to simultaneously depress both said first biased pin and said second biased pin.

* * * * *